United States Patent [19]

Sussman

[11] 4,378,397
[45] Mar. 29, 1983

[54] HEAT AND COLD RETENTIVE COMPOSITE ARTICLE AND ASSOCIATED METHODS

[76] Inventor: Sy Sussman, Franklin Square, N.Y.
[21] Appl. No.: 315,043
[22] Filed: Oct. 26, 1981
[51] Int. Cl.³ .................... B32B 7/02; B32B 5/32; B32B 17/00
[52] U.S. Cl. .................... 428/215; 428/35; 428/314.4; 428/316.6; 428/319.1; 428/410
[58] Field of Search ............ 428/314.4, 314.8, 316.6, 428/318.4, 319.1, 35, 410, 213, 215; 220/450, 453; 126/246; 229/3.5 MF; 219/461, 464, 522

[56] References Cited
U.S. PATENT DOCUMENTS 3,782,998  1/1974  Condo et al. .................... 428/314.8
4,055,699  10/1977  Hsiung .................... 428/213
4,122,203  10/1978  Stahl .................... 428/921
4,256,799  3/1981  Ohashi et al. .................... 428/319.1

Primary Examiner—William J. Van Balen
Attorney, Agent, or Firm—Posnack, Roberts, Cohen & Spiecens

[57] ABSTRACT

A heat and cold retention article of manufacture comprising a plurality of layers including a thermal transmission layer of tempered glass free from metal, a foam layer of low density and a lower foam layer of relatively high density. In this configuration, the article of manufacture is suitable as a hot plate and, if a vessel for containing hot or cold substances is employed, the foam layers of relatively low and high density are interposed between two outer layers of metal material which sandwich the foam layers therebetween.

13 Claims, 4 Drawing Figures

HEAT AND COLD RETENTIVE COMPOSITE ARTICLE AND ASSOCIATED METHODS

FIELD OF THE INVENTION

The invention relates to articles adapted for retaining the temperature of an object placed thereon. More particularly, the invention is concerned with articles such as hot plates or trivets which are intended to maintain the temperature of heated or cooled articles placed thereon. The term "hot plate" or "trivet" is used in a broad sense to indicate both hot and cold retaining properties.

The invention also relates to means for maintaining the temperature of heated or cooled substances placed in a container.

The invention also relates to methods for maintaining the heated or cooled state of an article or a substance which is contained within the article.

PRIOR ART

It is well known to employ panels made of glass or other transparent materials for various purposes including heat transmission and heat insulation.

U.S. Pat. No. 4,071,649 discloses fireproof glasswork comprising a fire screening, glazing panel formed of a plurality of structural plies with layers of heat convertible thermally insulating barrier-forming material on each ply sandwiching a plastic membrane between the barrier-forming material. The panel is intended to prevent or delay propagation of fire across an opening closed by the panel.

U.S. Pat. No. 3,919,441 discloses a calorific material for panel-styled calorific devices suited for heating areas and having heat retaining and regenerative properties. The device is characterized by mixing a paste of a metal powder with a synthetic oil and firing the mixture to a temperature sufficient to melt and partially oxidize the metal.

U.S. Pat. No. 4,082,892 discloses a temperature sensitive glass assembly adapted for transmitting or reflecting light. Namely, the construction of the glass assembly is such that it is transparent below a given temperature and opaque at temperatures above that temperature. The construction is characterized by employing an oxazoline or mixture of oxazolines between a double paned glass assembly.

U.S. Pat. No. 4,173,668 discloses a fire-screening panel adapted to maintain its effectiveness in preventing fire propagation even after aging of the panel. The pane comprises first and second vitreous structural sheets with a layer of intumescent material disposed therebetween.

U.S. Pat. No. 4,104,427 is also related to a laminated light-transmitting fire-screening panel having a construction similar to that in the previously described patent.

U.S. Pat. No. 3,930,822 is directed to the production carbon-containing glass resistors having high resistivity by the use of furfuryl alcohol to provide a continuous carbon phase in a porous glass.

U.S. Pat. No. 2,313,802 is directed to an infra-red filter media which is transparent or translucent to visible radiation and, at the same time, substantially opaque to infra-red radiation.

U.S. Pat. No. 3,652,370 relates to a heat-blocking glass sheet having a number of small fragments of glass color adhered to one surface to absorb considerable amounts of visible rays and heat rays.

SUMMARY OF THE INVENTION

While the prior art shows various provisions for modifying the properties of panels including glass sheets, this is effected with a view towards heat insulation or transmission.

An object of the present invention is to provide an article of manufacture which will have the capability of preserving the heated or cool state of an object placed thereon.

A further object of the invention is to provide such an article which is simple to manufacture and which can be used in the conventional manner of a hot plate or trivet.

A further object of the invention is to provide an article of manufacture of the above type which is of a multi-layer composite construction which is easily assembled from readily obtainable materials.

Yet, another object of the invention is to provide an article which will have the capability of maintaining the temperature of an object heated to 150° F. at its temperature for approximately 30 minutes while also having the capability of maintaining the temperature of a cooled object at 50°-60° F. for 30 minutes.

In this way, cooked and baked products can be held at their temperature as can be cooled beverages.

In a particular configuration, the invention contemplates retaining the temperature of an article heated to 180° F. to a temperature of between 166° and 170° F. after 30 minutes while also being capable of holding the temperature of a cooled article at 60° F. to a temperature of 70° F. after 30 minutes.

A further object of the invention is to provide a heat and cold retention article which is unaffected by water and dishwasher detergents which enables its cleaning and washing in a dishwasher at elevated temperature.

Still a further object of the invention is to provide a heat and cold retention article which is fireproof and will not support combustion.

Still another object of the invention is to provide a heat and cold retention article which does not require the use of electrical energy to provide the heat and cold retention properties but, in contrast, furnishes these properties in a passive condition.

A further object of the invention is to provide a heat and cold retention article which is of a simple construction to allow its constructive configuration to take many forms such as hot plates, trivets, trays, boards or to allow its use in cooking articles such as pots, pans and the like.

In accordance with the above and further objects, the invention provides a heat and cold retention article comprising a thermal transmission layer capable of transmission of heat energy, a thermal absorption layer on the thermal transmission layer and a thermal barrier layer on the thermal absorption layer.

The thermal absorption layer is constituted of a closed cell foam material adapted for thermal flow to and from the thermal transmission layer and the thermal barrier layer is also made from a closed cell foam material to prevent heat transmission to and from the absorption layer. The foam material of the thermal absorption layer is of relatively low density and the foam material of the thermal barrier layer is of relatively high density.

The thermal transmission layer can be a sheet of tempered glass which is lead-free and also substantially free from iron. It is light transparent and, thus, serves to provide a greenhouse effect in respect of the absorption layer to provide suitable conditions for temperature maintenance of heated and cooled articles placed on the glass sheet. More specifically, the low density foam layer tends to serve as a heat sink which establishes an equilibrium condition with the heated or cooled article placed on the thermal transmission layer to preserve the temperature of the object.

The invention will now be described in relation to specific embodiments thereof with reference to the attached drawing.

DETAILED DESCRIPTION

Figure 1:
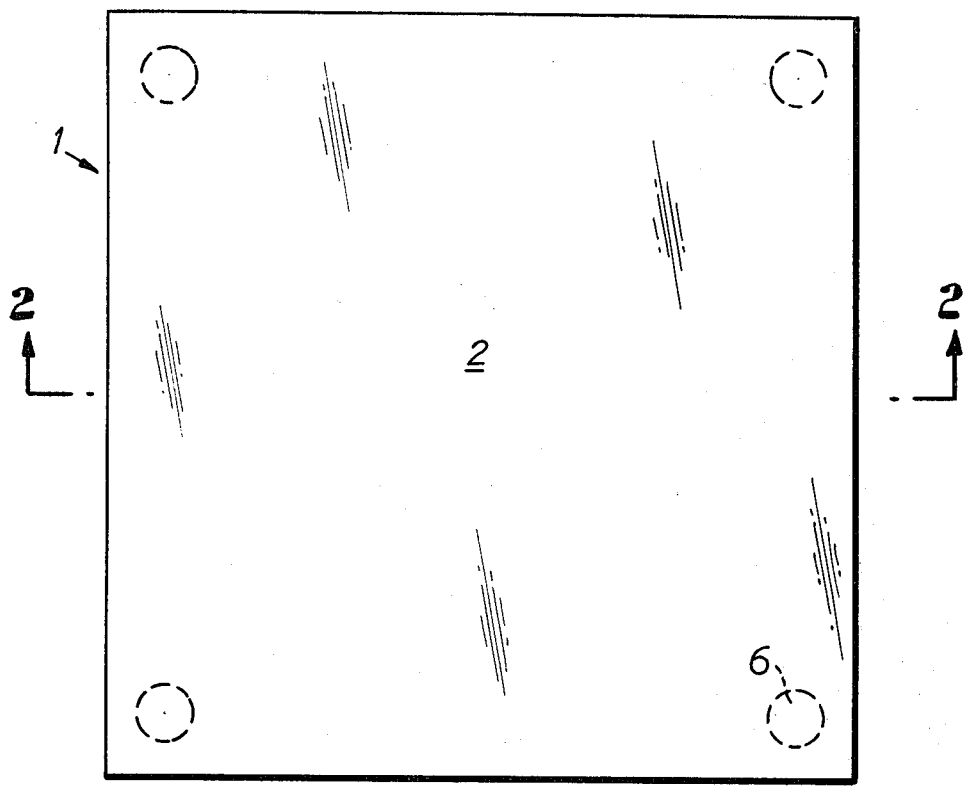
FIG. 1 is a plan view of an article according to the present invention.
Figure 2:
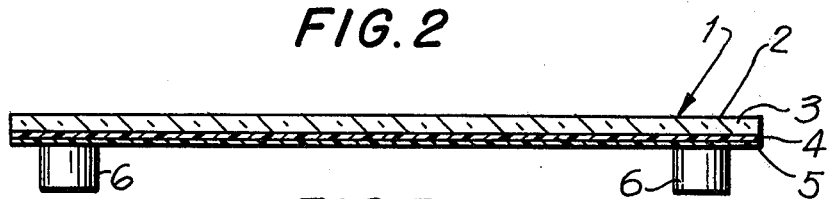
FIG. 2 is a sectional view taken on line 2—2 in FIG. 1.

FIGS. 1 and 2 show a hot plate or trivet 1 adapted to maintain the temperature of an object placed on the upper surface 2 thereof. In effect, whether a heated or cooled object is placed on surface 2, the article 1 will have the property of maintaining the heated or cooled state of the object.

The article 1 consists of a multi-layer composite including an outer layer 3 whose upper surface constitutes the surface 2 of the article, a middle, thermal absorption layer 4 and a lower, thermal barrier layer 5.

The upper layer 3 is a thermal transmission layer which is capable of transmission of heat energy. Preferably, the layer 3 is formed of a tempered glass material which is free of lead and is substantially free of iron oxide. The glass contains iron oxide in an amount less than 0.12% and preferably, less than 0.04% and generally, of the order of 0.01%. In this way, the glass is capable of high transmission of thermal energy since the iron oxide which normally absorbs a portion of the thermal energy is unable to do so because of its absence. Similarly, other metals which normally are present in the glass, such as lead, are omitted. Essentially, the glass is a conventional glass composed of silicon dioxide, aragonite, soda ash, salt cake and aluminum hydrate. The glass is tempered for safety and high strength. It is essentially non-combustible and dimensionally stable. The glass layer can be translucent, transparent or opaque and can be provided with any range of colors as desired.

The thermal absorption layer 4 is composed of a relatively low density, closed cell foam material, preferably polyethylene.

The lower thermal barrier layer 5 is composed of a relatively high density, closed cell foam material, preferally polyvinyl chloride.

The arrangement of the layers 3, 4 and 5 in the arrangement as described above permits transmission of thermal energy from an object placed on surface 2 through layer 3 into layer 4. The layers 3 and 4 serve as a means which permits the transmission of thermal energy to and from the object placed on surface 2 to maintain the temperature thereof. The thermal barrier layer 5 prevents heat transmission to and from the layer 4 so that equilibrium is established between the object and layers 3 and 4. Essentially, due to the closed cell configuration of the polyethylene layer 4, this serves as a substantial thermal retention means which is effective to absorb heat from a heated object and remain in a condition of equilibrium therewith to continue to furnish heat to the object to keep it at its heated temperature. Similarly, in the case of a cooled article, the layer 4 will act as an insulator rapidly assuming the temperature of the cooled article and will abstract heat from the article as the temperature thereof tends to rise whereby to maintain the cooled state of the article. The glass layer 3 serves as thermal transmission layer and provides a greenhouse effect for the thermally absorptive layer 4.

In order for the layer 4 to serve as a thermal absorption layer, it must have a relatively low density of the order of 0.2 whereas the layer 5, in order to preserve its thermal barrier properties must have a relatively high density of the order of 0.7.

In a typical construction, the glass layer 3 has a nominal thickness of 3/16 of an inch while the layer 4 has a thickness of 3 mm and the layer 5 has a thickness of 2 mm.

The layer 4 is joined to the layer 3 by means of a conventional adhesive and layers 4 and 5 are joined together also by means of a conventional adhesive.

The closed cell foam layers 4 and 5 are fire resistant and dimensionally stable.

The composite article 1 is illustrated in the form of a hot plate or trivet and is provided with feet 6 at the undersurface of layer 5 to provide a support for the article. The feet 6 can be made of a resilient material such as rubber and are adhesively joined to the layer 5 with conventional adhesives.

Figure 3:
FIG. 3 is similar to FIG. 2, but shows a modification thereof.

In order to increase the thermal blocking properties of layer 5, a thin aluminum layer 7 can be adhesively joined to the lower face of layer 5 as illustrated in FIG. 3. The aluminum layer can have a thickness of 1 mm or less.

Figure 4:
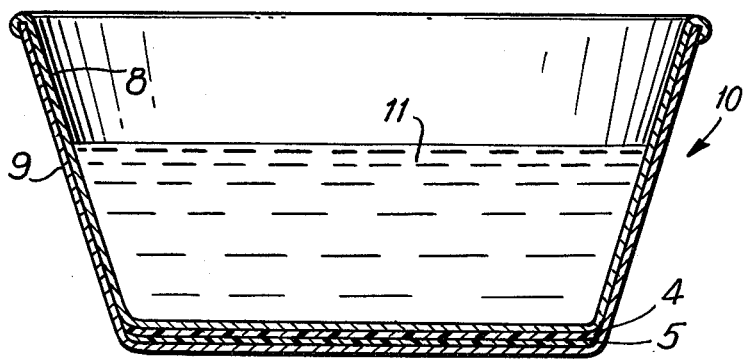
FIG. 4 is a transverse section through another embodiment of the invention.

FIG. 4 shows another embodiment of the invention wherein a vessel 10 is formed with inner and outer layers 8 and 9 of stainless steel or similar material between which are sandwiched layers 4 and 5 at the bottom thereof. The layers 4 and 5 are thus not visible from the outside of the vessel. Any substance 11 which has been heated or cooled and placed within vessel 10 is maintained in temperature due to the provision of the layers 4 and 5. As in the embodiments of FIGS. 1-3, the layer 4 has a thickness of 3 mm and the layer 5 a thickness of 2 mm. The thickness of the layers 8 and 9 of the vessel 10 can be between 1 and 2 mm.

DESCRIPTION OF TEST EMBODIMENT

An article similar to that shown in FIG. 2 was constructed with a tempered glass layer 3 having a thickness of 3/16" and of square configuration 8 inches on a side. Layer 4 was formed of closed cell cross-linked polyethylene foam of a density of 0.07 and a thickness of 3 mm. Layer 5 was formed of closed cell polyvinyl chloride foam of a density of 0.7 and a thickness of 2 mm.

A flat bottomed aluminum kettle holding four pounds of water was heated to bring the water to boil as measured by a thermometer introduced into the kettle and the kettle was placed on the test panel constructed as above. The test panel was placed on a flat two foot square metal sheet. The kettle was also placed directly on the metal sheet without the test panel. The results of the test are given in the table hereafter.

| | (A) WITH HEAT RET. PANEL | | | (B) WITHOUT HEAT RET. PANEL | |
|---|---|---|---|---|---|
| TIME | TEMP. DEG F. | DEG. F. LOSS | | TEMP. DEG F. | DEG. F. LOSS |
| Start | 209.3 | | Start | 209.3 | |
| 30 MIN. | 182.3 | −27.0 | 30 MIN. | 166.5 | −42.8 |
| Start | 168.9 | | Start | 166.5 | |
| 30 MIN. | 158.1 | −10.8 | 30 MIN. | 150.6 | −15.9 |
| Start | 149.5 | | Start | 150.6 | |
| 30 MIN. | 141.6 | −7.9 | 30 MIN. | 138.8 | −11.8 |

As seen from the above, commencing at a temperature of 209.3° F., temperature loss after 30 minutes using the panel of the invention was 27°, whereas without the panel it was 42.8°. The temperature drop without the panel was 47% greater than it was with the panel of the invention. At an initial temperature of 166.5° without the panel and at 168.9° with the panel, the temperature drop was 15.9° without the panel and 10.8° with the panel or 47% greater without the panel. At an initial temperature of 150.6° without the panel and 149.5° with the panel, the respective temperature drops were 11.8° and 7.9° or 49% greater without the panel. The temperature drop without the panel generally was between 45 and 55% greater than with the panel of the invention.

In similar tests run with liquids at cold temperatures, it was found that the test panel of the invention inhibited temperature gain of the liquid in approximately the same manner, that is, by reducing the heat gain by 45-55%. A glass of cold water at 60° F. was kept to a temperature of 70° F. after standing for thirty minutes on the panel of the invention in an atmosphere whose ambient temperature was 78°, whereas without the panel, the water assumed a temperature of between 75° and 77° F. after thirty minutes.

Although the invention has been described in conjunction with specific embodiments thereof, it will become apparent to those skilled in the art that numerous modifications and variations can be made within the scope and spirit of the invention as defined, in the attached claims.

What is claimed is:

1. A heat and cold retention article of manufacture comprising a thermal transmission layer capable of transmission of heat energy, said layer having opposite surfaces, a thermal absorption layer of closed cell foam material on one of said surfaces of said thermal transmission layer for thermal storage and a thermal barrier layer on said thermal absorption layer for preventing heat transmission between said absorption layer and the ambient atmosphere, said thermal transmission layer being tempered glass which is lead free.

2. An article as claimed in claim 1 wherein said thermal barrier layer is a closed cell foam material, said thermal absorption layer being of relatively low density and said thermal barrier layer being of relatively high density.

3. An article as claimed in claim 2 wherein said closed cell foam material of said thermal absorption layer is PVC.

4. An article as claimed in claim 3 wherein said closed cell foam material of said thermal barrier layer is polyethylene.

5. An article as claimed in claim 4 wherein said layer of PVC has a density of 0.7.

6. An article as claimed in claim 5 wherein said layer of polyethylene has a density of 0.07.

7. An article as claimed in claim 6 wherein said thermal transmission layer has a thickness of 3/16", said thermal absorption layer a thickness of 3 mm and said thermal barrier layer a thickness of 2 mm.

8. An article as claimed in claim 1 comprising feet on said thermal barrier layer for support of the article on a support surface.

9. An article as claimed in claim 1 comprising a metal layer on said thermal barrier layer.

10. An article as claimed in claim 9 comprising feet on said metal layer for support of the article on a support surface.

11. An article as claimed in claim 1 wherein said layers are planar and said article is a flat composite of said layers.

12. An article as claimed in claim 1 wherein said tempered glass is also substantially free of iron.

13. A method of maintaining the temperature of a heated or cooled object placed on a surface of a support comprising forming said support as a multi-layer article including a substrate layer, a thermal absorption layer and a thermal barrier layer, placing the object to be heated or cooled on said substrate layer, said thermal absorption layer being on the surface of the substrate layer remote from the surface on which the object is placed, said thermal barrier layer being on the thermal absorption layer, said substrate layer being tempered glass which is free of lead and substantially free of iron, and transmitting energy to and from the object and to and from said thermal absorption layer via said substrate layer of tempered glass, whereby said substrate and thermal absorption layers assume the temperature of said object and tend to stabilize said temperature of the object over a period of time, said thermal barrier layer preventing heat transfer from the thermal absorption layer to the ambient atmosphere.

* * * * *